Figure 2:
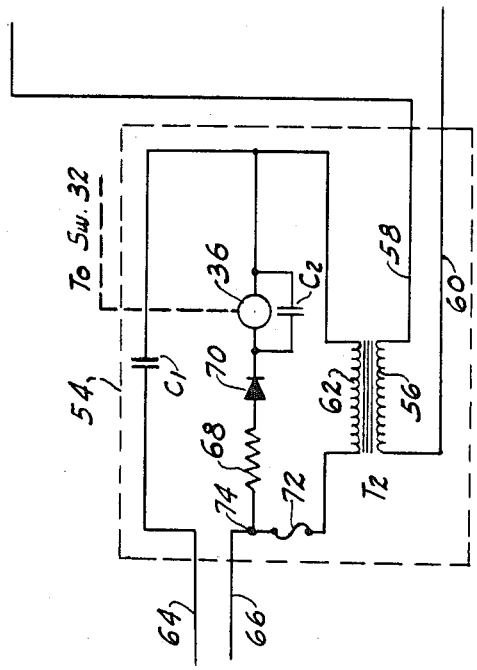

United States Patent [19]

Vogel et al.

[11] Patent Number: 4,551,984

[45] Date of Patent: Nov. 12, 1985

[54] DEGRADATION SENSING AND SHUT-DOWN MEANS FOR REFRIGERATION MOTOR-COMPRESSOR UNITS

[75] Inventors: Richard E. Vogel, Cincinnati; Benjamin Bowsky, Maineville, both of Ohio

[73] Assignee: Emerson Electric Co., St. Louis, Mo.

[21] Appl. No.: 652,840

[22] Filed: Sep. 21, 1984

Related U.S. Application Data

[62] Division of Ser. No. 499,321, May 31, 1983, Pat. No. 4,490,988.

[51] Int. Cl.$^4$ .............................................. F25B 31/00
[52] U.S. Cl. ...................................... 62/193; 184/6.4; 361/104
[58] Field of Search ................. 62/192, 193, 468, 175, 62/84; 184/6.4, 108; 123/196 S; 340/604, 631; 361/104, 178; 307/118

[56] References Cited

U.S. PATENT DOCUMENTS 2,552,088  5/1951  Davis ................................. 340/631
3,959,980  6/1976  Hamilton ........................... 62/126
3,959,984  6/1976  Vlasak ............................ 361/104 X Primary Examiner—William E. Wayner
Attorney, Agent, or Firm—Charles E. Markham

[57] ABSTRACT

Means for continuously shutting-down operation of an enclosed motor-compressor unit upon predetermined contamination of the refrigerant-oil mixture therein by conductive particles which comprises providing a normally open switch in the motor energizing circuit operated to a closed position by a sensitive D.C. relay when energized, in immersing a pair of spaced electrodes in the refrigerant-oil mixture, connecting the electrodes across an A.C. power source, connecting the D.C. relay in parallel with the electrodes across the A.C. power source through rectifying and voltage dropping means and in providing a fusible link in the A.C. power source connections so as to be responsive to a predetermined sum of current flow across the electrodes plus through the relay to break the connections, and in the provision of a normally open fusible switch responsive to fuse and close in response to a predetermined high motor temperature and through relay means open a second normally closed switch to break also the motor energizing circuit.

3 Claims, 2 Drawing Figures 4,551,984

DEGRADATION SENSING AND SHUT-DOWN MEANS FOR REFRIGERATION MOTOR-COMPRESSOR UNITS

This application is a division of pending application Ser. No. 499,321 filed May 31, 1983 now U.S. Pat. No. 4,490,988.

This invention relates to the sensing of electrically conductive contaminant particles in the refrigerant-oil mixture in enclosed motor-compressor units for refrigeration or heat pump service and to means for continuously shutting-down operation of the unit when contamination reaches a predetermined degree.

BACKGROUND OF THE INVENTION

Contamination of the refrigerant-lubricating oil mixture in the lower portion or sump of the encasements of hermetically sealed or semi-sealed motor-compressor units employed in air conditioning or heat pump service increases with the length of service. This contamination consists for the most part of electrically conductive particles such as metal chips and carbon particles and may include semi-conductive particles or charged ions from lubricant or refrigerant breakdown. When contamination reaches a sufficient level or degree it causes malfunctioning of the compressor, clogging of the refrigerant lines and undue loading and overheating of the driving motor to the extent that a hazardous condition may result. Motor manufacturers usually provide recycling overtemperature switches of the bimetal type installed in the motor stator to provide a temporary shut-down of the motor until it cools sufficiently.

But such recycling switches merely prolong a hazardous condition because usually in most instances the operation of the unit is infrequently monitored. When degradation of the unit as reflected in contamination of the refrigerant-oil mixture reaches a level indicative of a hazardous condition or indicative that the unit is nearing the end of its useful life a continued shut-down of the unit is essential. On the other hand an undesirable level of contamination may occur early in the service of the unit or at least substantially before the end of its useful life. In such instances and wherein the encasement of the unit is such that it is practical to replace the contaminated refrigerant-oil mixture, a more discriminating means for determining a lesser level of contamination and effecting in response thereto a continued shut-down of the unit is desirable.

OBJECTS OF THE INVENTION

It is an object of this invention to provide a generally new and improved means for effecting the continued shut-down of operation of a motor-compressor unit in response to a predetermined level of contamination of the refrigerant-oil mixture by conductive particles therein.

More specifically it is an object to provide a sensitive D.C. relay for holding closed a normally open switch that controls the motor energizing circuit to provide and immerse a pair of spaced electrodes in the refrigerant-oil mixture and connect them across an A.C. power source, to connect the sensitive D.C. relay in parallel with the electrodes through voltage dropping and rectifying means and to provide a fusible link positioned so as to be responsive to a predetermined total current flowing through the relay and across the electrodes to break connections connecting the electrodes and the relay with the A.C. power source.

A further object is to provide switch means for momentarily completing a circuit for the energization of said D.C. relay and for said motor.

IN THE DRAWINGS

Figure 1:
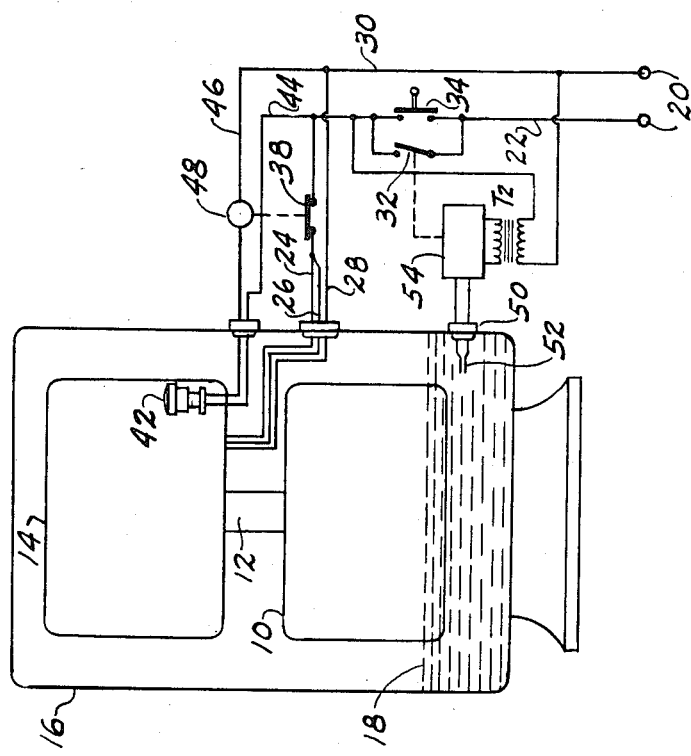

FIG. 1 is a diagrammatic illustration of a typical hermetically sealed motor-compressor unit for air conditioning or heat pump service including a motor energizing circuit and incorporating contamination and high motor temperature sensing means and circuit breaking relays constructed in accordance with the invention, and FIG. 2 is a wiring diagram showing the sensor and relay hold-in circuit employed in FIG. 1.

DESCRIPTION OF A PREFERRED FORM OF THE INVENTION

Referring to FIG. 1, a motor-compressor unit for air conditioning or heat pump service comprises a compressor 10 driven through a shaft 12 by a motor 14 positioned above the compressor. The unit is enclosed in a casing 16. Numeral 18 indicates a mixture of refrigerant and lubricating oil which conventionally accumulates in the lower portion or sump of the casing 16 which encloses the motor-compressor unit. The starting and running windings of motor 14 (not-shown) are connected across A.C. power source terminals 20 through leads 22, 24, 26 and 28 and return 30. There are two normally open switches 32 and 34 connected in parallel in lead 22. Switch 32 is operated to a closed position by a sensitive D.C. relay 36 when it is sufficiently energized (see FIG. 2) and switch 34 is a push-button switch intended to be closed momentarily either manually or remotely through relay means. There is also a normally closed relay operated switch 38 in lead 24.

Positioned in good heat transfer relationship with the motor 14, as in its stator, is a normally open, encapsulated, fusible switch service 42 which is connected in parallel with the windings of motor 14 by the leads 44 and 46. There is a relay 48 connected in the lead 46 in parallel with switch 38 and which when energized opens the normally closed switch 38 to break the energizing circuit for the windings of motor 14 and the normally open switch 42 closes in response to a predetermined high temperature of motor 14 to complete a circuit for energizing relay 48.

A contaminant sensor generally indicated at 50 is provided for sensing the degree of contamination of the refrigerant-oil mixture 18 by conductive particles therein. The sensor 50 comprises a pair of spaced electrodes 52 which extend through the casing wall and are positioned so as to be immersed in the mixture. A circuit for applying a sufficient D.C. current through relay 36 and for applying an A.C. potential across the sensor electrodes 52 is indicated at 54 in FIG. 1 and is shown diagrammatically in FIG. 2.

Referring to FIGS. 1 and 2, a transformer $T_2$ has a primary winding 567 connected across the A.C. power supply leads 22 and 30 through switches 32 and 34 by leads 58 and 60. The ends of the secondary winding 62 of transformer $T_2$ are connected to electrodes 52 of the sensor 50 through leads 64 and 66. The D.C. relay 36 is connected across the leads 64 and 66 in parallel with electrodes 52 through a voltage dropping resistor 68 and a rectifying diode 70. There is also a capacitor $C_1$ in the lead 64 for the purpose of reducing the inductive effect of the relay coil 36 and a capacitor $C_2$ connected across the relay 36 for the purpose of reducing the effect of spikes on the sensor electrodes and for the purpose of filtering the unidirectional current flow through the relay. There is also a relatively low current sensitive fuse 72 in lead 66 connected therein between the secondary winding 62 and the junction 74 of the lead connecting relay 36 across the leads 64 and 66 so that energization of relay 36 is controlled by fuse 72.

When push button switch 34 is closed momentarily the D.C. relay 36 is energized sufficiently through fuse 72, resistor 68 and diode 70 to pull in switch 32 and thereafter relay 36 is energized at this level. Concurrently a relatively high A.C. voltage is impressed across electrodes 52. When contamination of the refrigerant-oil mixture results in a contaminant tract across the sensor electrodes 52 which allows sufficient charged ions and electrons to flow thereacross the resulting current flow thereacross is in addition to the current flowing through the relay coil 36. When the sum of current flow across the sensor electrodes plus that flowing through relay coil 36 exceeds a predetermined amount the current sensitive fuse 72 will open thereby de-energizing the relay 36 and permitting the normally open switch 32 to open thereby shutting-down operation of the motor-compressor unit. If push button switch 34 is subsequently closed following a shut-down because of contamination as sensed by the electrodes the unit will again operate but will shut-down again when the switch is released unless contamination is corrected.

We claim:

1. In an enclosed motor-compressor unit for air conditioning or heat pump service which includes a refrigerant-oil mixture in the enclosure, primary A.C. electrical power source, circuit connections including a normally open switch connecting the motor of said unit across said A.C. power source, a D.C. relay which when energized closes said normally open switch thereby to complete said motor energizing circuit, a contaminant sensor for sensing conductive particles in said mixture comprising a pair of spaced electrodes immersed in said mixture, a circuit for concurrently imposing an A.C. potential gradient across said electrodes and energizing said D.C. relay comprising circuit connections connecting said electrodes across a second A.C. power source and circuit connections including a voltage dropping resistor and rectifying means connecting said D.C. relay in parallel with said electrodes, and a fuse connected in series with both said electrodes and said relay and responsive to a predetermined sum of current flow across said electrodes and said relay to open and break said circuit connecting said electrodes and said relay across said second A.C. power source thereby to thereby to continuously shut-down said unit.

2. The combination of a motor-compressor unit and continuous shut-down means therefor as claimed in claim 1 in which said circuit for connecting said electrodes and said D.C. relay across said second A.C. power source includes said normally open switch and in which means including a push button switch connected in parallel with said normally open switch is provided for momentarily completing said circuit.

3. The combination of a motor-compressor unit and the continuous shut-down means therefor claimed in claim 1 in which said second A.C. power source is transformer coupled to said primary A.C. power source.

* * * * *